(12) United States Patent
Howe et al.

(10) Patent No.: US 11,130,279 B2
(45) Date of Patent: Sep. 28, 2021

(54) DROP DRAW/EXTRUDE (DD/E) PRINTING METHOD

(71) Applicant: The Boeing Company, Chicago, IL (US)

(72) Inventors: Christopher A. Howe, Port Melbourne (AU); Justin Hicks, Noorat (AU); Michelle Louise Gee, Bundoora (AU); Thomas Wilson, Port Melbourne (AU); Adrian Mouritz, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/779,287

(22) Filed: Jan. 31, 2020

(65) Prior Publication Data

US 2020/0164570 A1 May 28, 2020

Related U.S. Application Data

(63) Continuation of application No. 15/957,050, filed on Apr. 19, 2018, now Pat. No. 10,583,605.

(51) Int. Cl.
| | |
|---|---|
| *B33Y 80/00* | (2015.01) |
| *B29C 64/118* | (2017.01) |
| *B33Y 10/00* | (2015.01) |
| *B33Y 30/00* | (2015.01) |
| *B33Y 50/02* | (2015.01) |
| *B29C 64/20* | (2017.01) |
| *B29C 64/209* | (2017.01) |

(Continued)

(52) U.S. Cl.
CPC ............ *B29C 64/118* (2017.08); *B05D 1/40* (2013.01); *B05D 1/42* (2013.01); *B05D 7/00* (2013.01); *B29C 64/106* (2017.08); *B29C 64/20* (2017.08); *B29C 64/209* (2017.08); *B29C 64/393* (2017.08); *B33Y 10/00* (2014.12); *B33Y 30/00* (2014.12); *B33Y 50/02* (2014.12); *B33Y 80/00* (2014.12); *B29K 2101/12* (2013.01); *B33Y 70/00* (2014.12)

(58) Field of Classification Search
CPC ...................................................... B33Y 80/00
USPC ...................................................... 428/195.1
See application file for complete search history.

(56) References Cited

U.S. PATENT DOCUMENTS

| | | | |
|---|---|---|---|
| 4,001,366 | A | 1/1977 | Brumlik |
| 6,422,848 | B1 | 7/2002 | Allen et al. |

(Continued)

FOREIGN PATENT DOCUMENTS

EP 3000922 3/2016

OTHER PUBLICATIONS

Extended European Search Report dated Oct. 7, 2019 for European Patent Application No. 19170386.7.

(Continued)

*Primary Examiner* — Betelhem Shewareged
(74) *Attorney, Agent, or Firm* — Gates & Cooper LLP

(57) ABSTRACT

A drop draw and extrusion method that creates anchor points around, within, or around and within, the region where a two dimensional fibrous architecture is deposited. Between the anchor points, a nozzle translates at high speeds to draw, extrude, or draw and extrude (depending on the print settings), a filament from the nozzle and build a two dimensional network of filaments connected by the anchors. Webbed architectures fabricated using the methods described herein exhibit superior structural properties.

20 Claims, 17 Drawing Sheets

(51) Int. Cl.
*B29C 64/393* (2017.01)
*B29C 64/106* (2017.01)
*B05D 1/40* (2006.01)
*B05D 1/42* (2006.01)
*B05D 7/00* (2006.01)
*B33Y 70/00* (2020.01)
*B29K 101/12* (2006.01)

(56) References Cited

U.S. PATENT DOCUMENTS

| | | | |
|---|---|---|---|
| 7,981,495 B2 | 7/2011 | Kim et al. | |
| 9,845,556 B2 | 12/2017 | Meure et al. | |
| 10,081,722 B2 | 9/2018 | Meure et al. | |
| 2002/0112325 A1 | 8/2002 | Keohan et al. | |
| 2010/0065367 A1 | 3/2010 | Vermilyea et al. | |
| 2012/0156422 A1 | 6/2012 | Kozar et al. | |
| 2014/0291886 A1* | 10/2014 | Mark | B29C 64/209 264/163 |
| 2015/0024203 A1 | 1/2015 | Choi et al. | |
| 2016/0031182 A1 | 2/2016 | Quinn et al. | |
| 2016/0083871 A1 | 3/2016 | Meure et al. | |
| 2016/0114532 A1 | 4/2016 | Schirtzinger et al. | |
| 2020/0164570 A1* | 5/2020 | Howe | B33Y 30/00 |

OTHER PUBLICATIONS

PCT International Search Report and Written Opinion dated Oct. 7, 2019 for PCT Application No. PCT/US2019/026542.

Quick Reference: 7 Families of Additive Manufacturing, copyright 2015-2018 by Hybrid Manufacturing Technologies, retrieved from http://www.hybridmanutech.com uploads/2/3/6/9/23690678/7_families_of_3d_printing_by_hybrid_v11_2p.pdf on Jul. 7, 2019, 2 pages. (Year: 2015).

Extended European Search Report dated Sep. 9, 2019 for European Patent Application No. 19170124.2.

Nguyen, A.T.T., et al., "Hierarchical surface features for improved bonding and fracture toughness of metal-metal and metal-composite bonded joints", International Journal of Adhesion & Adhesives, 2016, pp. 81-92, vol. 66.

Vaidya, U.K., et al., "Affordable Processing and Characterization of Multi-Functional Z-Pin Reinforced VARTM Composites", Proceedings of the 13th International Conference on Composite Materials, 2001, pp. 1-10.

Heimbs, S., et al., "Failure behaviour of composite T-joints with novel metallic arrow-pin reinforcement", Composite Structures, 2014, pp. 16-28, vol. 110.

* cited by examiner

DROP DRAW/EXTRUDE (DD/E) PRINTING METHOD

CROSS REFERENCE TO RELATED APPLICATIONS

This application is a continuation under 35 U.S.C. § 120 of co-pending and commonly-assigned U.S. Utility patent application Ser. No. 15/957,050 filed on Apr. 19, 2018 by Christopher A. Howe, Justin Hicks, Michelle Louise Gee, Thomas Wilson, and Adrian Mouritz, and entitled "DROP DRAW/EXTRUDE (DD/E) PRINTING METHOD," which application is incorporated by reference herein.

BACKGROUND

1. Field

The present disclosure describes novel additive manufacturing methods and structures fabricated using the same.

2. Description of the Related Art

Additive Manufacturing (AM) is a process by which three dimensional parts are made one layer at a time. In a typical example, an AM machine deposits material in molten form onto a build platform. The material is solidified on the build platform to form a layer of the part. Once a single layer of the part has been completed, the AM machine or build plate moves away in one layer increments and the AM machine proceeds to deposit the next layer of material. A common type of AM process is known as Fused Deposition Modeling (FDM), an extrusion-based process that feeds thermoplastic in solid wire form from a nozzle and then melts the wire into a shape that is then re-solidified. However, the FDM process has several limitations including (1) slower manufacturing times because the nozzle is in close proximity to the substrate and the thermoplastic needs time to bond, (2) the diameter of the extruded filament being larger than is desirable for some applications (3) inability to control the physical properties of the filament with sufficient precision, and (4) requiring the use of flat substrates because the close proximity of the nozzle to the substrate may cause collisions with non-flat substrates. As a result, conventional FDM is not capable of fabricating more complex AM structures having specially tailored properties.

What is needed, then, is an additive manufacturing technique that can rapidly fabricate a wider range of structures having tailored properties (e.g., where the properties are locally tailored in two dimensions). The present disclosure satisfies this need.

SUMMARY

The present disclosure describes a method for manufacturing a structure, comprising: (a) depositing material (124) from a print head (102) so as to create a first anchor (116a) at a first position (116b) on a substrate; (b) depositing the material (124) from the print head (102) so as to create a second anchor (116c) at a second position (116d) on the substrate and laterally separated from the first position (116b); (c) drawing a filament (600) of the material (124) extending from the first anchor (116a) to the second anchor (116c), comprising creating a vertical space between the substrate (112) and the print head (102), laterally moving the print head (102) or the substrate (112) or the print head (102) and the substrate (112) relative to one another so as to position the print head (102) above the second position (116d), and moving the substrate (112) and the print head (102) towards one another so as to connect the filament (600) to the second anchor (116c); and (d) repeating steps (a)-(c) so as to construct a pattern of the filaments (600) connecting a plurality of the anchors (114a, 114c).

Examples of print conditions during creation of the anchors and/or drawing of the filaments include, but are not limited to, the following.

1. Feeding material (124) for the anchors (114a, 114b) and the filaments (600) from a nozzle (108); and controlling the nozzle's (108) temperature, the speed of the nozzle (108) relative to the substrate (112), the nozzle's height above the substrate (1120, and a flow rate of the material (124) from the nozzle (108) so as to fabricate the filaments (600) having different properties at different two dimensional positions (114b, 114d) above the substrate (112), including different tensile strengths.

2. Feeding material (124) for the anchors (114a, 114b) and the filaments (600) from a nozzle (108); and moving the nozzle (108) or the substrate (112) or both the nozzle (108) and the substrate (112) relative to one another and controlling a flow rate of the material (124) so as to form the anchors (114a, 114b) having a minimum diameter in a range of 0.25-mm to 2.0-mm. In one or more examples, the filament diameter is in a range of 1.5-35% of the minimum diameter of the anchors (114a, 114b).

3. Feeding material (124) for the anchors (114a, 114b) and the filaments (600) from a nozzle (108); and moving the nozzle (108) or the substrate (112) or both the nozzle (108) and the substrate (112) relative to one another, controlling a flow rate of the material (124) in a range of 0.045-0.5 grams/minute (g/m), controlling a speed of the nozzle (108) relative to the substrate (112) in a range of 1 to 310 mm/second, controlling a height of the nozzle (108) above the substrate (112) in a range of 0.2-5 millimeters (mm), so as to form the filaments (600) having a diameter in the range of 30-450 micrometers. In one or more further examples, the filaments (600) have a filament diameter in a range between 80-200 microns.

4. Positioning the nozzle (108) at a height in a range of 2-5 mm above the substrate (112) so as to form the filaments (600) having a filament diameter in a range of 1.5-62% of a minimum diameter of the anchors (114a, 114b).

5. Moving the nozzle (108) at a speed relative to the substrate (112) in a range of 50 to 300 mm/seconds.

6. Feeding material (124) for the anchors (114a, 114b) and the filaments (600) from a nozzle (108); and positioning the nozzle (108) at a height in a range of 2 to 5 mm above the substrate (112) so as to draw the filaments (600) having a filament diameter in a range of 7-100% of the nozzle (108)'s diameter. In one or more examples, the nozzle's diameter is in a range from 0.2-0.5-mm.

7. Feeding material (124) for the anchors (114a, 114b) and the filaments (600) from a nozzle (108); and laterally moving the nozzle (108) or the substrate (112) or both the nozzle (108) and the substrate (112) relative to one another at a height in a range from 2 to 5-mm above the substrate (112). In one or more examples, the height of the nozzle (108) during creation of the anchors (114a, 114b) is in a range of 0.1 mm-0.4 mm. In one or more further examples, the height is in a range of 4 to 5 mm while drawing the filaments (600) laterally and the height of the nozzle (108) during creation of the anchors (114a, 114b) is in a range of 0.2 mm-0.4 mm.

8. Feeding a thermoplastic from the nozzle (108) and drawing the filament (600) using the nozzle (108) at a temperature 30 to 70° C. above a melting point of the thermoplastic. In one or more examples, the temperature is 30 to 50° C. above the melting point.

9. Feeding material (124) for the anchors (114a, 114b) and the filaments (600) from a nozzle (108) at a flow rate in a range of 0.045-0.5 grams/minute (g/m). In one or more examples, the flow rate is in a range of 0.045 g/min to 0.1 g/min.

10. Feeding material (124) for the anchors (114a, 114b) and the filaments (600) from a nozzle (108); and moving the nozzle (108) or the substrate (112) or both the nozzle (108) and the substrate (112) relative to each other, controlling a speed of the nozzle (108) relative to the substrate (112), controlling the nozzle's (108) temperature, and controlling a flow rate of the material (124) from the nozzle (108), so as to fabricate the pattern comprising the filaments (600) disposed in a web.

The present disclosure further describes a structure (700), comprising a plurality of anchors (114a, 114b) on a substrate (112); and a two dimensional network (702) of interconnected filaments (600) comprising a material (124) drawn between the anchors (114a, 114b), wherein the anchors (114a, 114b) have a minimum diameter in a range of 0.25-mm to 2.0-mm, the filaments (600) have a diameter in the range of 30-400 micrometers, the filaments (600) have a height in a range from 2 to 5-mm above the substrate (112), and the two dimensional network (702) has a maximum length in a range of 5 cm to 10 meters.

In one or more examples, the two dimensional network (702) is an adhesive or mechanical interlocking device, or a (e.g., thermoplastic) veil (700b) for reinforcing a composite. In one or more examples, the interconnected network (702) comprises a web (800) including a plurality of the filaments (600) disposed so as to form nested rings (802) and a plurality of the filaments (600) disposed so as to radially connect the nested rings (802).

BRIEF DESCRIPTION OF THE DRAWINGS

Referring now to the drawings in which like reference numbers represent corresponding parts throughout:

FIGS. 6C-6E illustrate control of the filament diameter using the DD/E method, wherein FIGS. 6C and 6D are different magnification scanning electron microscope images of the filaments fabricated according to one or more embodiments, and FIG. 6E is an optical image of the filaments fabricated according to one or more methods described herein.

FIG. 6F shows manufacturing of three designs, 3 fiber diameters, and 9 variations in areal weight.

FIGS. 7A-7C illustrate a veil interlaminar architecture printed using the DD/E method, showing controlled filament diameters, controlled direction and location of filaments, wherein FIG. 7B is a close up view showing the anchor points around the edge and FIG. 7C shows the region that results from the DD/E process when there is space between the nozzle and the substrate.

FIG. 8A-8D illustrate webbed architecture fabricated using the DD/E method, wherein FIG. 8B is a close up of FIG. 8A, FIG. 8C is a close up view showing the joint between radially disposed filaments and the filaments disposed in rings.

FIGS. 9A-9D illustrates the performance under a 270 in-lb impact of a composite including a webbed veil described herein, as compared to a conventional veil having the structure illustrated in FIG. 9E, wherein FIGS. 9A and 9B show the impact on the composite an additively manufactured nylon web veil fabricated according to embodiments of the present invention, and FIGS. 9B and 9D show the impact on the composite without the webbed veil but having a non-woven fabric veil as illustrated in FIG. 9E).

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes an additive manufacturing technique, termed drop-draw extrusion (DD/E), enabling greater control of additively deposited filaments that are drawn and/or extruded from an additive manufacturing (AM) machine.

Figures 1A, 1B:
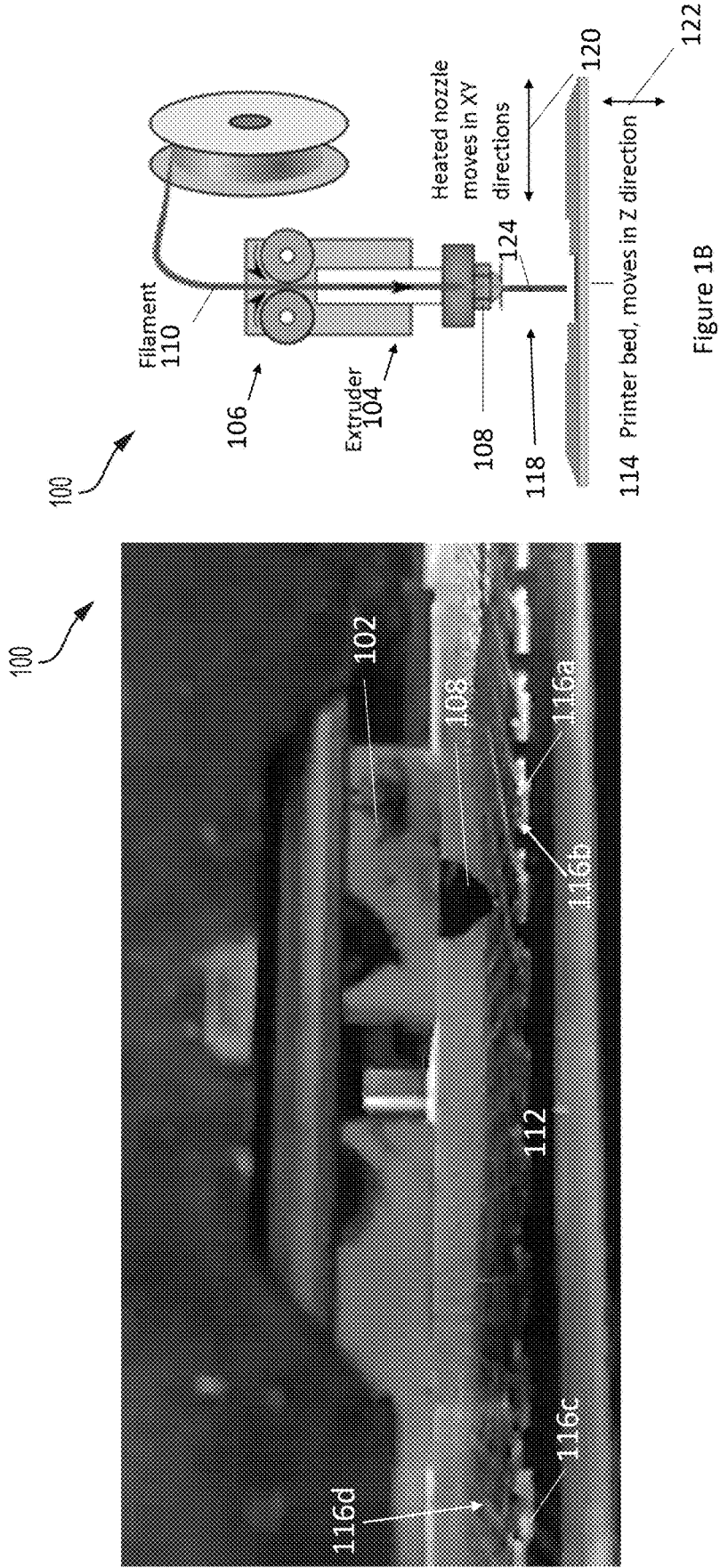
FIGS. 1A and 1B illustrate exemplary DD/E printers used to manufacture the composite articles described herein.

FIGS. 1A and 1B illustrate an exemplary additive deposition machine 100 comprising a print head 102, extruder 104, feeder 106, and nozzle 108 for feeding material (e.g., a filament 110) onto a substrate 112 on a build platform or printer bed 114. In one or more examples, the machine 100 is a desktop Fused Deposition Modeling (FDM) 3D printer. FIG. 1A further illustrates the anchor points or anchors 116a, 116c deposited on the substrate 112 around, within, or around and within, the region where a two dimensional fibrous architecture is to be deposited.

The machine 100 can drag and draw a filament of the material (124) extending from the first anchor 116a at a first position 116b on the substrate 112 to the second anchor 116c at a second position 116d on the substrate 112, by creating a vertical space 118 between the substrate 112 and the print head 102 above the first position 116b of the first anchor 114a, laterally moving (in an x-y plane 120) the print head 102 or the substrate (112), or both the print head (102) and the substrate 112 relative to one another so as to position the print head 102 above the second position 116d and drag and draw the filament between the first position 116b and the second position 116d, and moving the substrate 112 and the print head 102 towards one another in the vertical direction 122 so as to connect the filament to the second anchor 116c. Material (124) may be dragged across from one anchor point to another repeatedly to make a pattern of material (124) and the vertical space and lateral translation can be achieved by moving the nozzle (108) and/or the print bed (114).

In one or more examples, the anchor (116a, 116b) is defined as a substrate, foundation, and/or source for the filament (600, 110) providing the material (124) for the filament (600, 110) and/or providing something for the filament (600,110) to stick to once the filament (600) is formed.

Figure 2A:
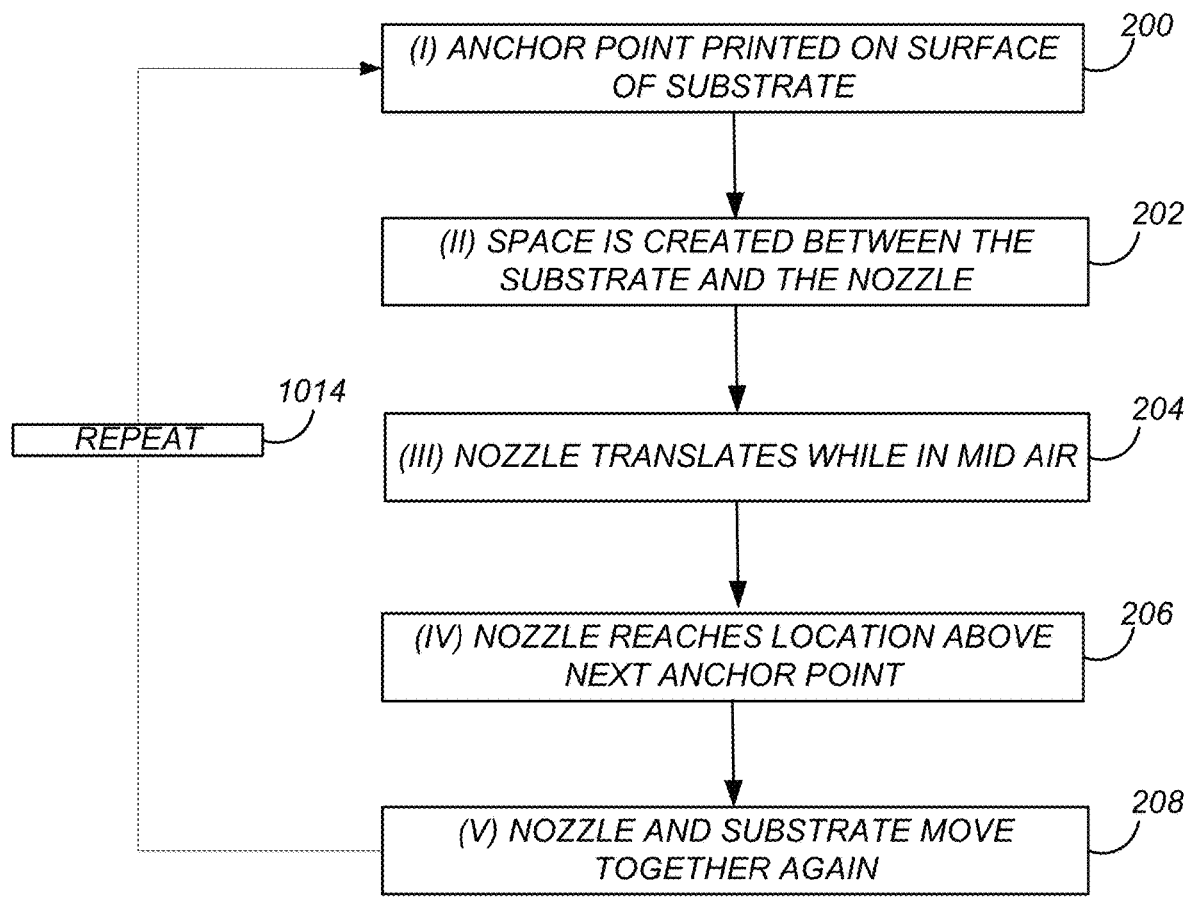
FIG. 2A is a flowchart illustrating a method of fabricating structures using a DD/E technique.

FIG. 2A is a flowchart illustrating the process of additively manufacturing a structure on a substrate 112, e.g., using the AM machine illustrated in FIGS. 1A and 1B. Anchor points may be created before or after the connection of the anchor points with filaments (600). Example substrates include, but are not limited to, fibrous substrates comprising fiber tows fabricated from at least one material (124) chosen from fiberglass, kevlar, and carbon. In one or more examples, the fiber tows are woven, e.g., so as to form a fiber mat. In other embodiments, the substrate comprises unidirectional tape with regular slits (comprising parallel tows with gaps therebetween), braids (e.g., stitched fabrics), or multi-axial reinforcements.

Block 200 represents creating (e.g., printing) an anchor (e.g., first anchor (116a) or anchor point) on a surface of a substrate 112. In one or more examples, the anchor (116a, 116b) is defined as a substrate, foundation, and/or source for the filament (600, 110) providing the material (124) for the filament (600, 110) and/or providing something for the filament (600,110) to stick to once the filament (600) is formed. In one or more examples, material (124) is deposited from an outlet (e.g., nozzle (108)) onto the substrate using the machine illustrated in FIG. 1 or FIG. 2B(I). Examples of the material (124) include at least one material (124) chosen from a polymer (e.g., nylon, polyetherketoneketone (PEKK), polyaryletherketone (PEK), polyimide), carbon, a carbon nanotube, a clay modifier, a thermoplastic (e.g., thermoplastic polymer), a hybrid thermoplastic, and metal.

Figure 2B:
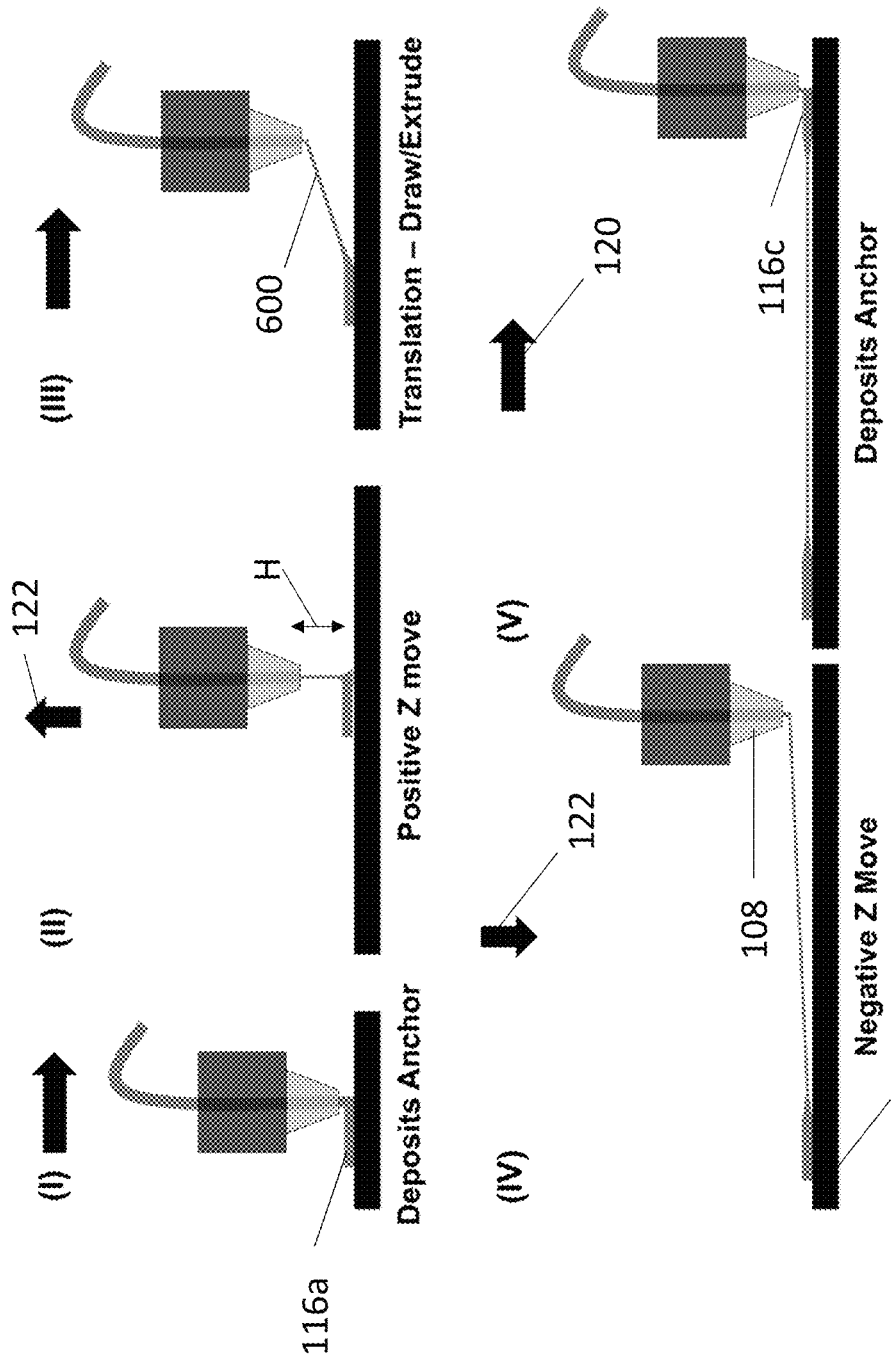
FIG. 2B illustrates the Drop & Draw/Extrude (DDE) 3D printing process, where (I) an anchor is laid on the substrate, (II) the head and build platform separate in a vertical movement creating a gap between the nozzle and the substrate, (III) the head translates at high speed, dragging a thin strand of thermoplastic with it, to a position above the next anchor point and, (IV) in another vertical movement, the nozzle returns to the substrate, (V) and then deposits the next anchor, where the process begins again.

Block 202 represents creating a space between the substrate and the outlet (e.g., nozzle (108)). In typical examples, either the nozzle translates upwards or the substrate translates downwards. For example, after the nozzle (108) deposits an anchor (116a) directly onto the surface of a substrate, the build platform drops away (e.g., vertically) from the nozzle (108) (or the nozzle (108) translates upward or vertically from the substrate) creating a large space between the substrate and the nozzle (108) while extruding/drawing a filament from the nozzle (108), as illustrated in FIG. 2B(II). In one or more examples, the nozzle (108) pulls on a drop of material while also supplying more of the material (124) to thin the material out into a filament or string.

Block 204 represents laterally and/or vertically (e.g., horizontally and/or vertically or simultaneously horizontally and vertically) moving the outlet (e.g., nozzle 108) or the substrate (112), or both the outlet and the substrate (112) relative to one another so as to position the outlet above the second position (116d) on the substrate. In one or more examples, the step includes moving the substrate (112) and/or print head (102) so as to) translate the print head (102) in mid-air (i.e., with vertical space between the nozzle (108) and the substrate (112)) while drawing/extruding the filament from the outlet. A string of thin deposition is created mid air (with vertical space between the nozzle (108) and the substrate (112)) by this movement, e.g., as illustrated in FIG. 2B(III). In one or more examples, vertical movement during translation creates increased space between the nozzle and the substrate.

Block 206 represents stopping the outlet and/or the substrate (112) so as to position the outlet at a next location (e.g., second position 116d) above the substrate (112).

Block 208 represents moving the outlet and/or substrate together again at the next location/position of the next anchor point (e.g., second anchor 116c), e.g., as illustrated in FIG. 2B(IV).

Block 210 represents repeating at least Block 200 to create a second anchor (116c) point on the substrate at the next location, e.g., as illustrated in FIG. 2B(V).

Steps 200-210 may be repeated in sequence a plurality of times to create a plurality of anchor points and laying material from one anchor to another as the outlet draws or pulls a filament extending from one anchor to the other. In this way, a two dimensional structure or architecture comprising the filaments (600) connecting anchor points is constructed.

The process may control the form and size of architectures in a single flat/curved plane as opposed to creating a thick "3D" object. In various examples, the architectures or patterns 700c can be deposited on a moving "roller" device, or directly onto a reinforcement.

Figure 2D:
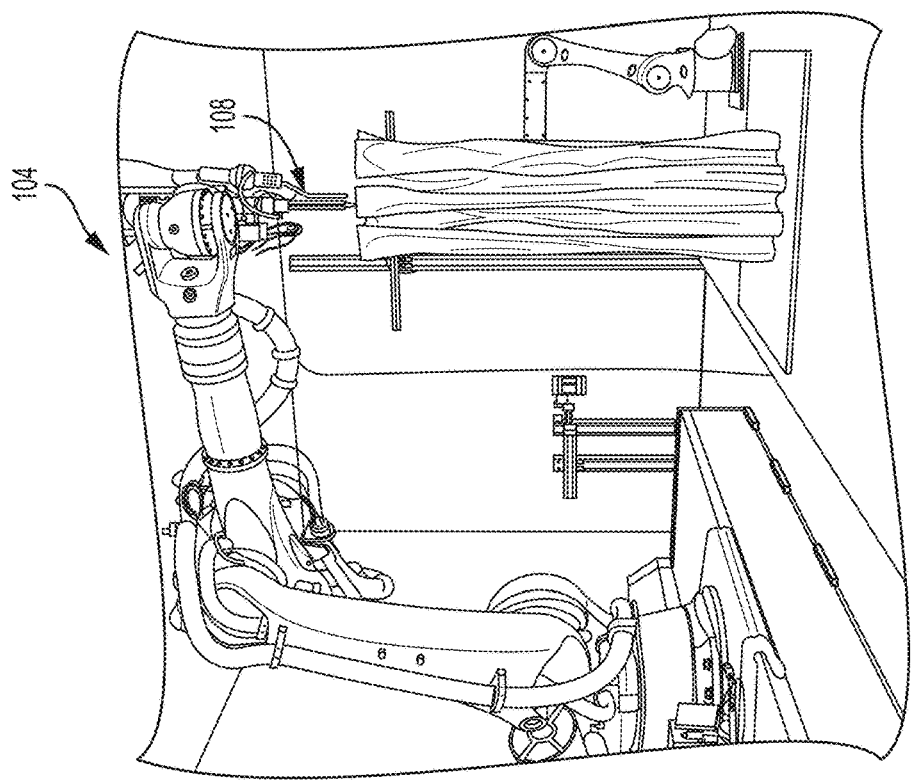
FIG. 2D illustrates large scale 3D printing according to one or more examples.
Figure 2C:
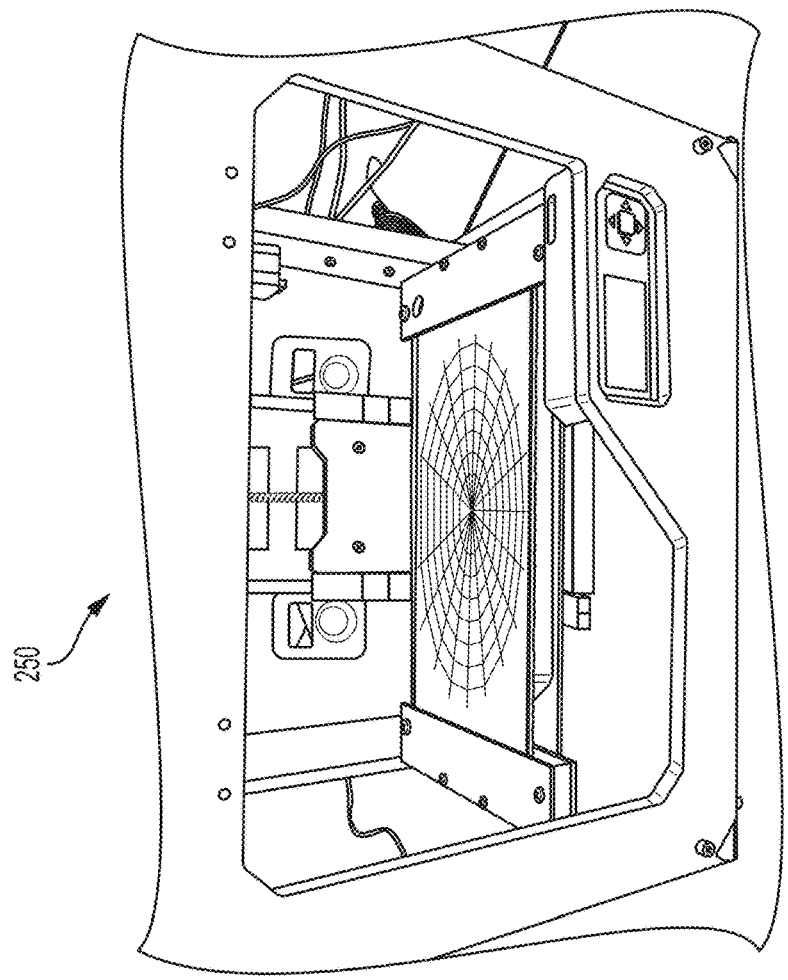
FIG. 2C illustrates three dimensional (3D) printing in a box according to one or more examples.

FIG. 2C shows formation of the thermoplastic architectures on a flat printer bed in a box (250). However, the DD/E methods described herein may also be implemented out of the printer box", for example, using an extruder head attached to a robot end effector as illustrated in FIG. 2D.

Moreover, control of the process parameters and inputs (nozzle speed, nozzle position, nozzle temperature, and/or material flow rate from the nozzle) enables the simultaneous and/or independent control of diameter of the filaments (600) (can be controlled at a given location by depositing material according to a power law as described below). In various examples, diameter of the filaments is controlled by the nozzle speed relative to the substrate and/or the amount of material/feed rate). The action of dragging the material controls the thickness of diameter of the filament (e.g., dragging the material thins the material). Thin filaments can be strong but light. In one or more embodiments, the material (e.g., thermoplastic) content is minimized by reducing the diameter so as to reduce weight while keeping a threshold strength.

- direction of filaments (600) (controlled by movement of the nozzle in an x-y plane);
- location of the filaments (600);
- material properties of the filaments (600). In one or more examples, surface morphology of the filaments is controlled by (speed of the nozzle relative to the substrate, temperature of the nozzle, moisture content (steam creates bubbles and roughness on material) and/or position of the nozzle.
- variation of fibrous architecture (e.g., throughout the same interlaminar region) in the same manufacturing step (multiple architectures in the same step) using the same AM machine. For example, direction of the filaments (600), spacing of the filaments (600), and filament diameter, and aerial weight can be varied as a function of position in the x-y plane.

In one or more embodiments, drawing straight sections of (e.g., thermoplastic) filaments (600) between two "anchor points" at high speed reduces the filament diameter, uses less material, provides extended control over the thermoplastic material properties on a localized basis, and increases manufacturing speed.

Examples of print conditions during creation of the anchors and/or drawing of the filaments include, but are not limited to, the following.

1. Feeding material (124) for the anchors (114a, 114b) and the filaments (600) from a nozzle (108); and controlling the nozzle's (108) temperature, the speed of the nozzle (108) relative to the substrate (112), the nozzle's height above the substrate (1120, and a flow rate of the material (124) from the nozzle (108) so as to fabricate the filaments (600) having different properties at different two dimensional positions (114b, 114d) above the substrate (112), including different tensile strengths.

2. Feeding material (124) for the anchors (114a, 114b) and the filaments (600) from a nozzle (108); and moving the nozzle (108) or the substrate (112), or both the nozzle (108) and the substrate (112) relative to one another/each other and controlling a flow rate of the material (124) so as to form the anchors (114a, 114b) having a minimum diameter in a range of 0.25-mm to 2.0-mm. In one or more examples, the filament diameter is in a range of 1.5-35% of the minimum diameter of the anchors (114a, 114b).

3. Feeding material (124) for the anchors (114a, 114b) and the filaments (600) from a nozzle (108); and moving the nozzle (108) or the substrate (112), or both the nozzle (108) and the substrate (112) relative to one another/each other, controlling a flow rate of the material (124) in a range of 0.045-0.5 grams/minute (g/m), controlling a speed of the nozzle (108) relative to the substrate (112) in a range of 1 to 310 mm/second, controlling a height of the nozzle (108) above the substrate (112) in a range of 0.2-5 mm, so as to form the filaments (600) having a diameter in the range of 30-450 micrometers. In one or more further examples, the filaments (600) have a filament diameter in a range between 80-200 microns.

4. Positioning the nozzle (108) at a height in a range of 2-5 mm above the substrate (112) so as to form the filaments (600) having a filament diameter in a range of 1.5-62% of a minimum diameter of the anchors (114a, 114b).

5. Moving the nozzle (108) at a speed relative to the substrate (112) in a range of 50 to 300 mm/seconds.

6. Feeding material (124) for the anchors (114a, 114b) and the filaments (600) from a nozzle (108); and positioning the nozzle (108) at a height in a range of 2 to 5 mm above the substrate (112) so as to draw the filaments (600) having a filament diameter in a range of 7-100% of the nozzle (108)'s diameter. In one or more examples, the nozzle's diameter is in a range from 0.2-0.5-mm.

7. Feeding material (124) for the anchors (114a, 114b) and the filaments (600) from a nozzle (108); and laterally moving the nozzle (108) or the substrate (112), or both the nozzle (108) and the substrate (112) relative to one another/each other at a height in a range from 2 to 5-mm above the substrate (112). In one or more examples, the height of the nozzle (108) during creation of the anchors (114a, 114b) is in a range of 0.1 mm-0.4 mm. In one or more further examples, the height is in a range of 4 to 5 mm while drawing the filaments (600) laterally and the height of the nozzle (108) during creation of the anchors (114a, 114b) is in a range of 0.2 mm-0.4 mm.

8. Feeding the material (124) comprising a thermoplastic from the nozzle (108) and drawing the filament (600) using the nozzle (108) at a temperature 30 to 70° C. above a melting point of the thermoplastic. In one or more examples, the temperature is 30 to 50° C. above the melting point.

9. Feeding material (124) for the anchors (114a, 114b) and the filaments (600) from a nozzle (108) at a flow rate in a range of 0.045-0.5 grams/minute (g/m). In one or more examples, the flow rate is in a range of 0.045 g/min to 0.1 g/min.

10. Feeding material (124) for the anchors (114a, 114b) and the filaments (600) from a nozzle (108); and moving the nozzle (108) or the substrate (112), or both the nozzle (108) and the substrate (112) relative to one another/each other, controlling a speed of the nozzle (108) relative to the substrate (112), controlling the nozzle's (108) temperature, and controlling a flow rate of the material (124) from the nozzle (108), so as to fabricate the pattern comprising the filaments (600) disposed in a web.

Figure 3:
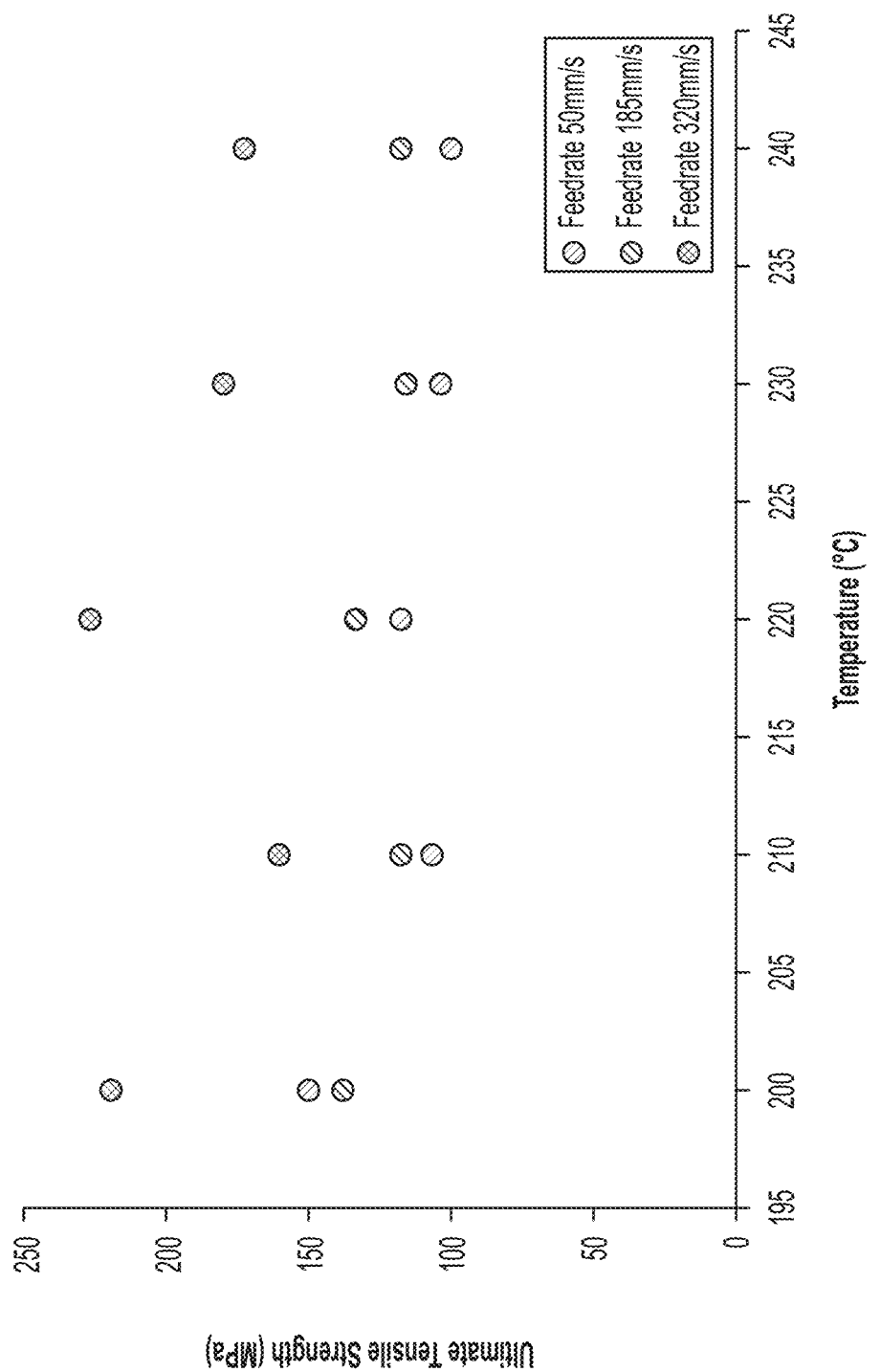
FIG. 3 illustrates variations in tensile strength of printed thermoplastic filaments over a range of print settings using an exemplary DD/E method.
Figure 4:
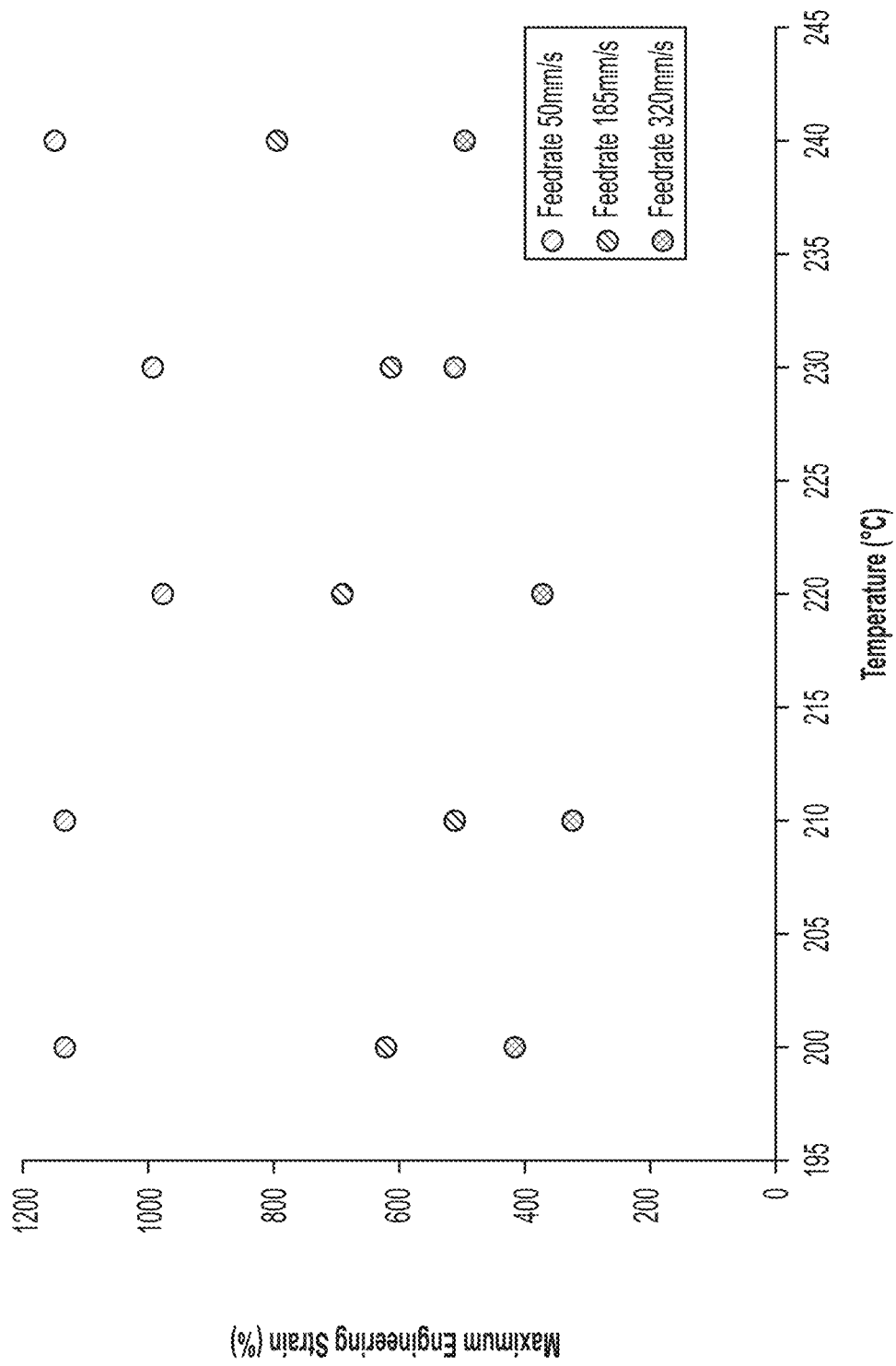
FIG. 4 illustrates variations in engineering strain of printed thermoplastic filaments over a range of print settings using an exemplary DD/E printing method.
Figure 5:
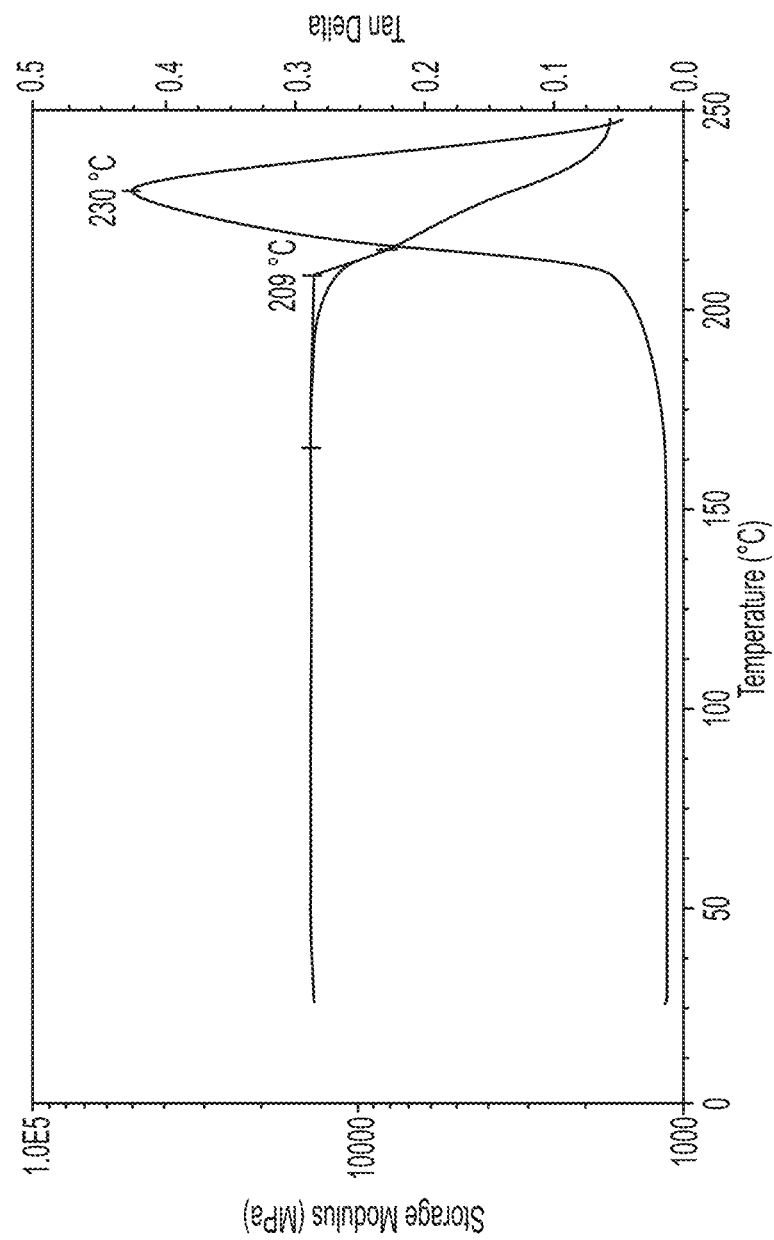
FIG. 5 illustrates storage modulus of filaments as a function of nozzle temperature, using a dynamic mechanical analysis standard test method per ASTM 640, with the plotted results calculated based on the difference between the storage and loss modulus as a function or temperature. The peak in the tan delta as plotted is identified to be an indication of the glass transition temperature for the tested material system.

Controlling Material Properties FIGS. 3, 4, and 5 illustrate how additive manufacturing deposition conditions (nozzle temperature) changes and/or controls the material properties of the filaments. The variations in the tensile strength and engineering strain have been included as examples, however other material properties can also be controlled through the additive manufacturing process by controlling influential printer inputs, such as feed rate, thermoplastic flow rate, and nozzle temperature.

Figure 6A:
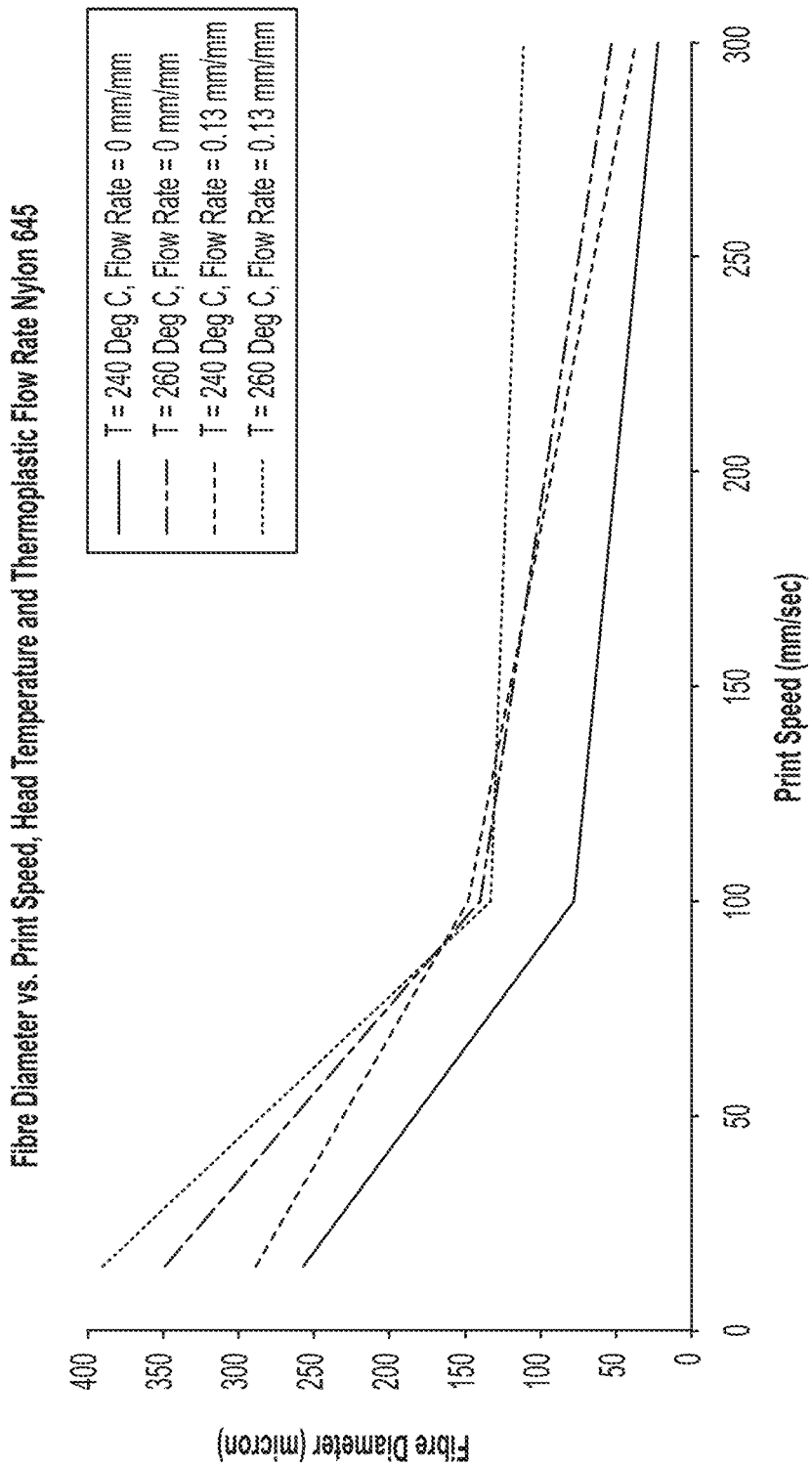
FIG. 6A illustrates filament diameter as a function of print speed using the DD/E method.

FIG. 6A plots fiber diameter as a function of print speed and nozzle temperature. The diameter D of the filament (600) was found to be a function of flow rate ($F_{rate}$) of material (124) into and out of the nozzle (108)), seep or flow rate ($m_{seep}$) of material flowing under gravity from extruder (104) into nozzle, and time ($t_{delay}$) taken moving the nozzle from one point (e.g., first position 116b) to another point (e.g., second position 116d) above the substrate). The power law equation was generated using empirical data and physics based relationships and relates how to control the filament diameter as a function of extrusion temperature, head translation speed (mm/sec), and thermoplastic flow rate (g/min).

Figure 6B:
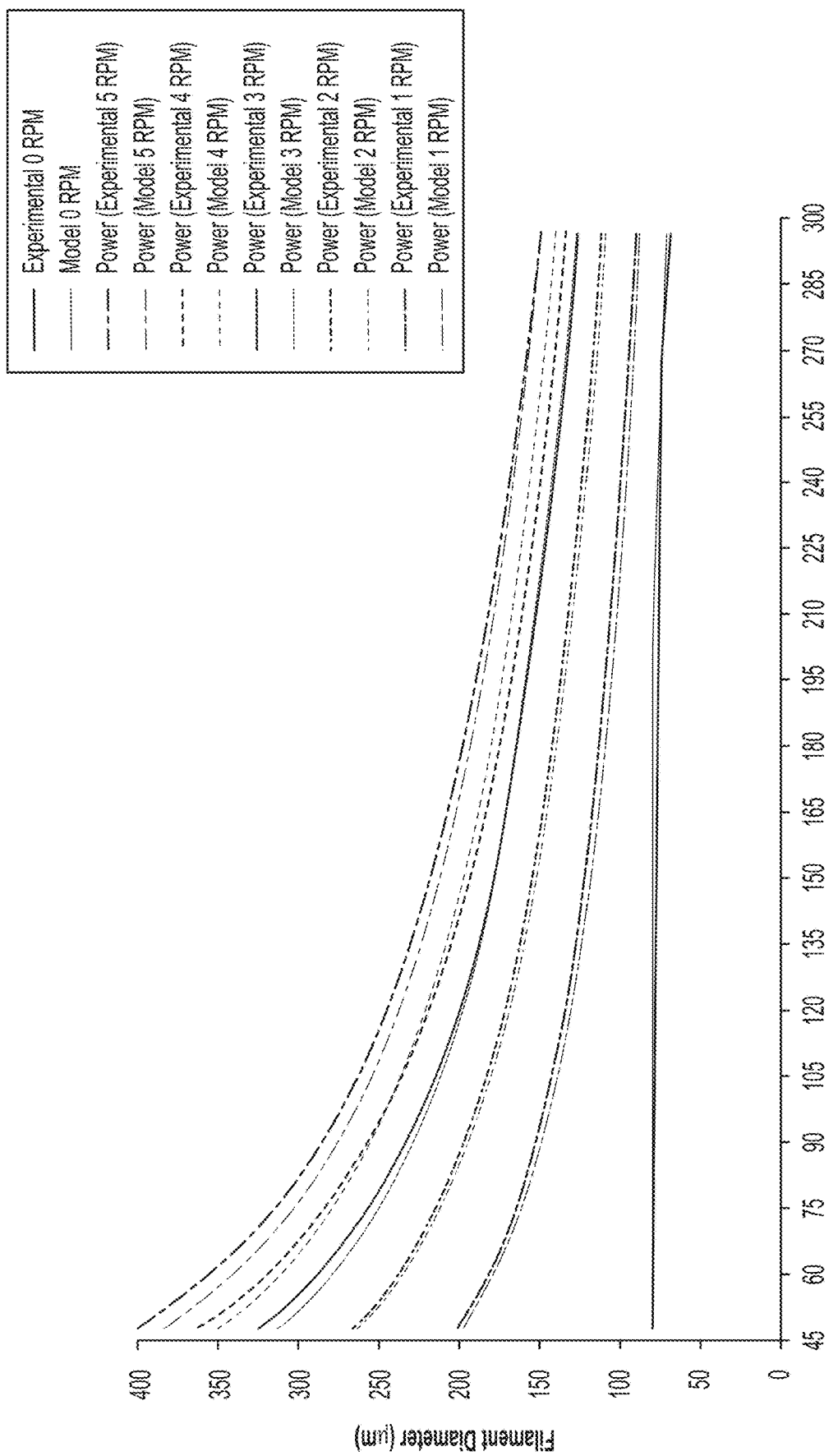
FIG. 6B illustrates filament diameter as a function of actual translation speed of the nozzle using the DD/E method, as a function of filament feed rate in revolutions per minute (RPM), showing measured data (experimental) as well as results for a model of the experimental results (model).
Figure 6C:
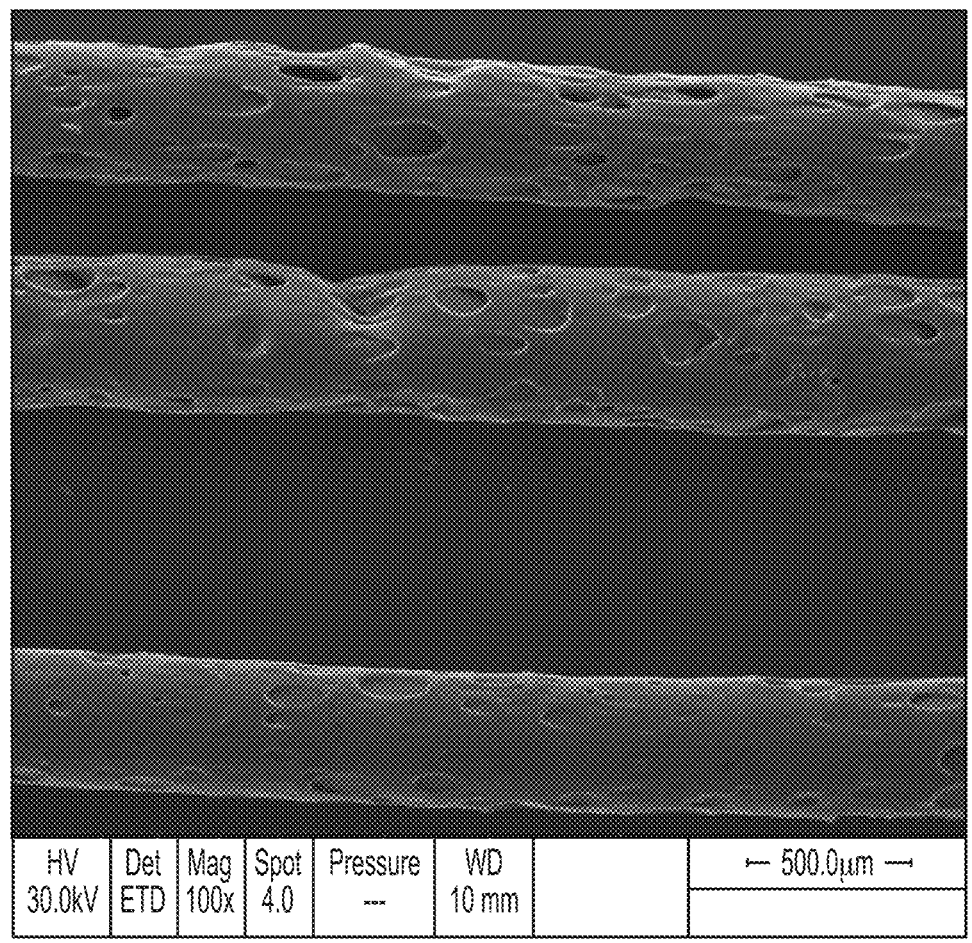
Figure 6E:
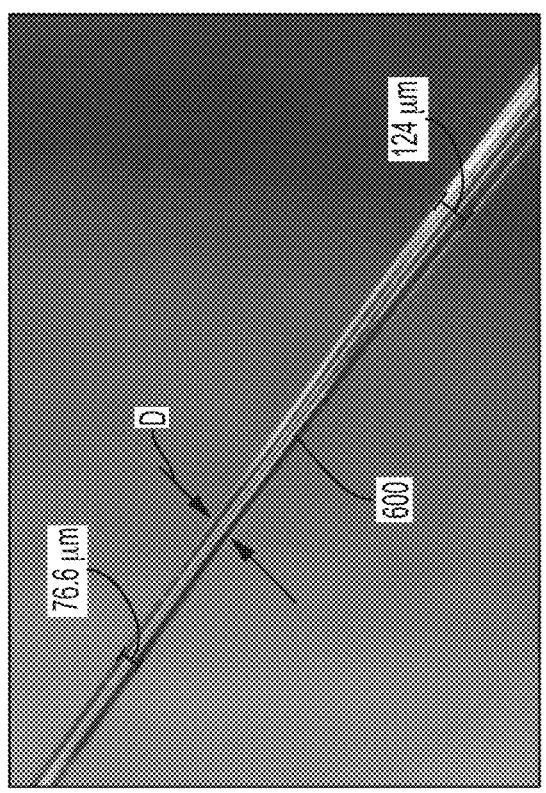
Figure 6D:
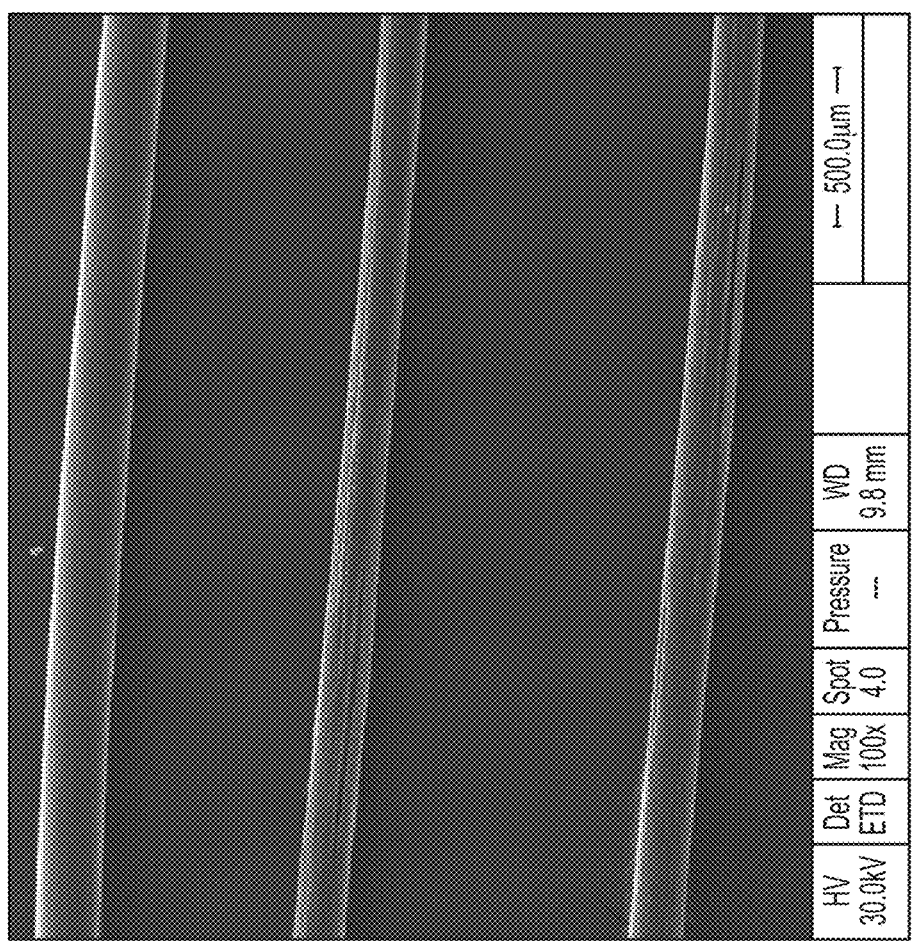
Figure 6F:
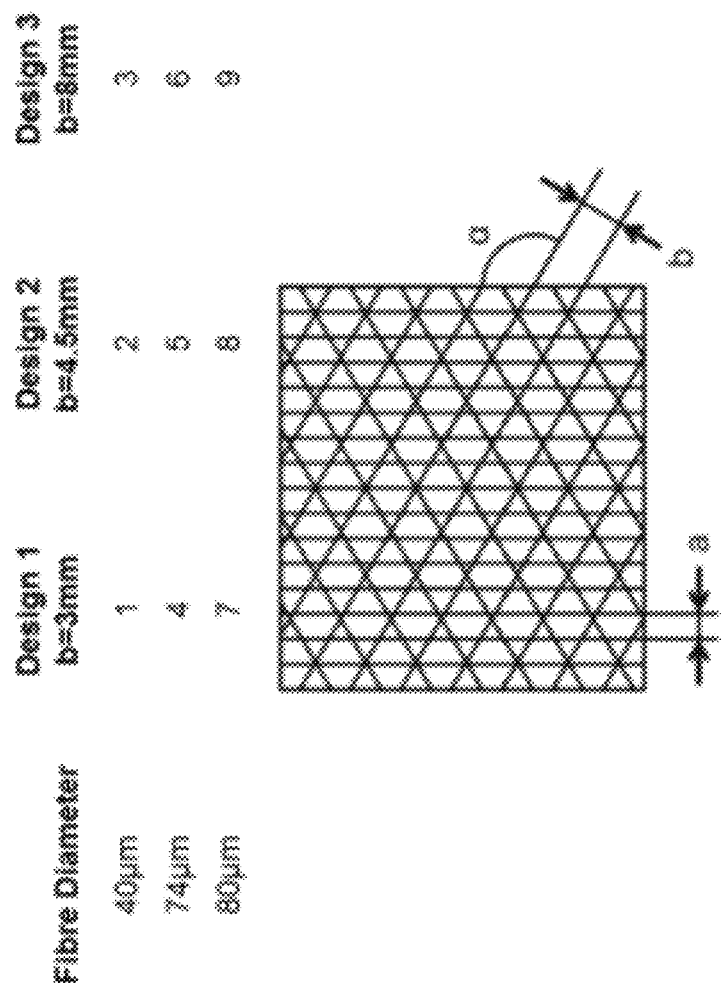
FIG. 6F illustrates how the DD/E method controls direction of the filaments, spacing of the filaments, and filament diameter, and aerial weight as a function of position in the x-y plane.

FIGS. 6B-6D are results confirming how thinner filament lines can be fabricated by having the printer head farther away and/or by varying the printer head speed. In one or more embodiments, the printer head speed is the same as the speed of the nozzle (108) connected to the printer head.

Control of printing parameters assists in producing high-performance interlayer technologies comprising laminated composite material with tailored properties for particular system applications. Conventional assembly techniques can only process at a single setting for the entire architecture, and therefore cannot vary material properties on a location by location basis as provided for by exemplary embodiments described herein. FIG. 6E illustrates how the DD/E method controls direction of the filaments, spacing of the filaments, and filament diameter, and aerial weight as a function of position in the x-y plane (in region A, the filament diameter is 0.04 mm, in region B the filament diameter is 0.03 mm).

Example Structures

Figure 7B:
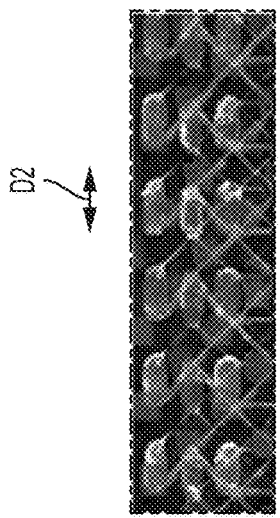
Figure 7C:
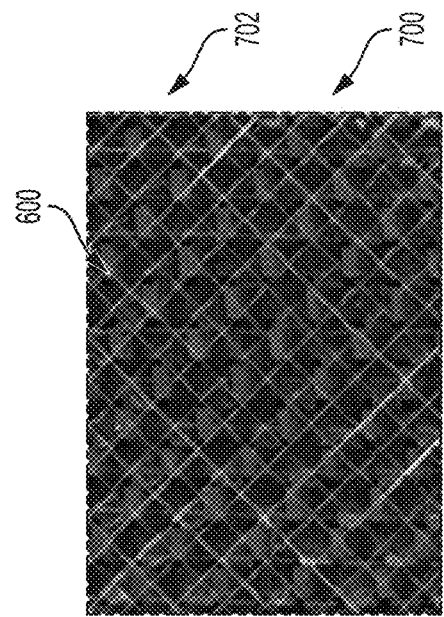
Figure 7A:
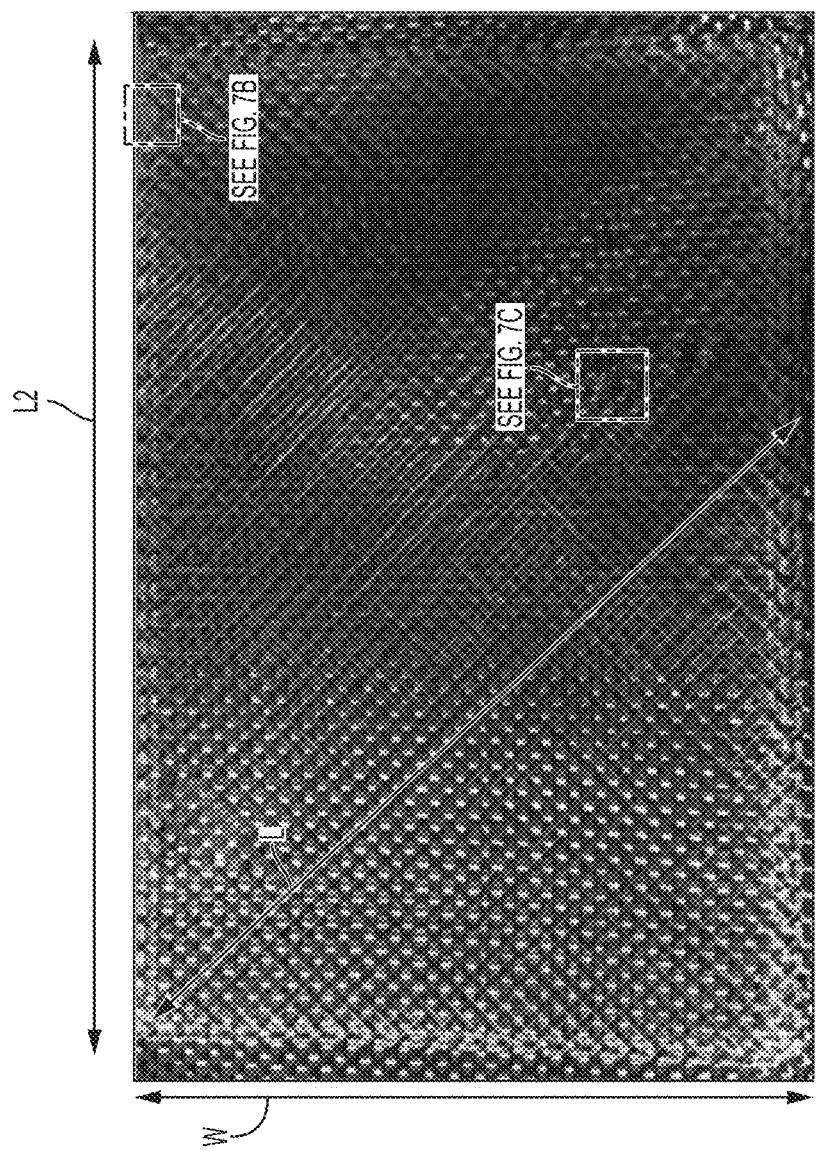
Figure 8D:
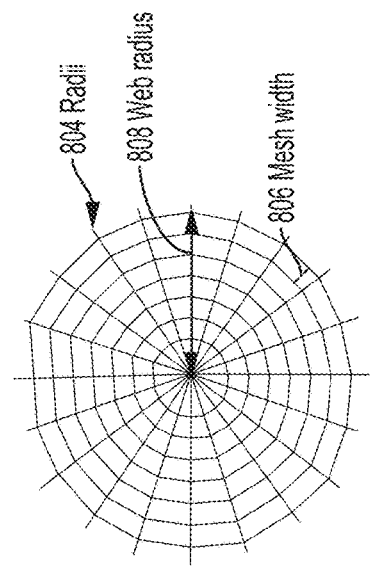
Figure 8B:
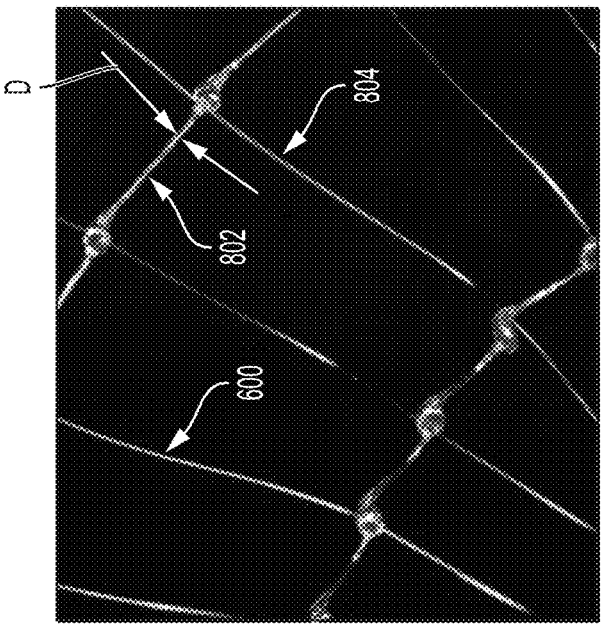
Figure 8A:
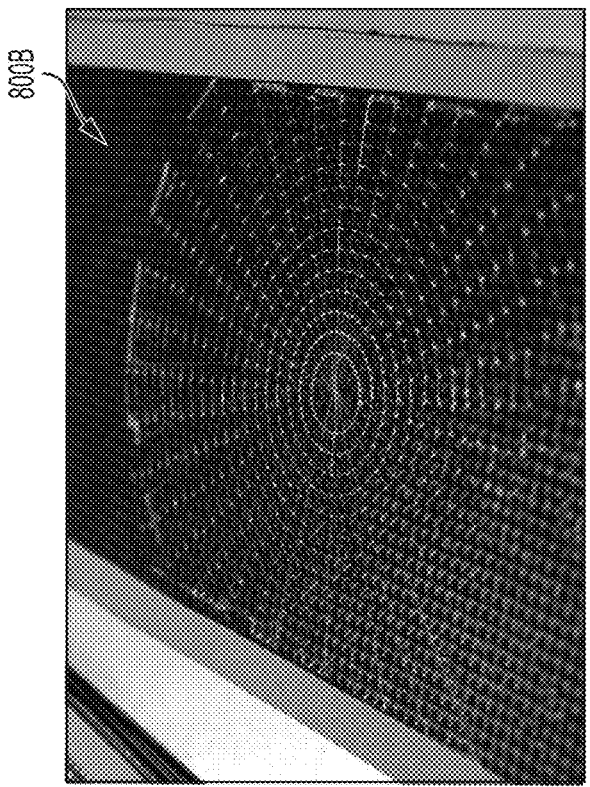
Figure 8C:
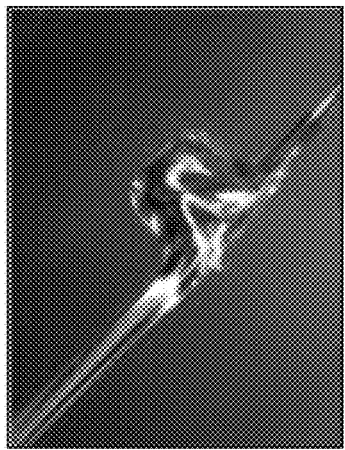

FIG. 7A illustrates a structure (700) fabricated using the method illustrated in FIG. 2. The structure (700) comprises a plurality of anchors (116a, 116c) on a substrate (112); and a two dimensional network (702) of interconnected filaments (600) comprising a thermoplastic drawn between the anchors (116a, 116b). Example dimensions for the anchors include a minimum diameter D2 in a range of 0.25-mm to 2.0-mm. Example dimensions for the filaments 600 include a diameter D in the range of 30-400 micrometers. Example lengths L of the filaments include a length in a range of 5 cm to 10 meters (e.g., so that the two dimensional network has a diameter, width W, or length L in a range of 5 cm to 10 meters).

The structure 700 illustrated in FIGS. 7A-7C is a veil 700b interlaminar architecture for implementation in a laminated composite material system (veil toughened composite). In typical examples, the a toughened composite includes a plurality of alternating layers alternating between the carbon fiber mat and the two dimensional structure. As described herein, embodiments of the DD/E method provide much greater flexibility in design of architectures for interlayer toughening technologies, including, but not limited to, control over direction of the filaments, diameter of filaments, and location of the filament.

The methods described herein also allow for multiple architectures to exist in the same interlaminar region (e.g., the architecture can be varied on a location by location basis) in the same manufacturing step. FIGS. 8A, 8B, 8C, and 8D illustrate an example where the structure 700 comprises a web 800 including filaments 600 disposed in nested rings 802 as well as radially so as to connect the rings 802. The location of the radially disposed filaments 804, the mesh width 806 (see FIG. 8D), the filament diameter D (e.g., in a range of 7-150 microns), the web radius 808, the areal weight (e.g., in a range of 1.5-2.5 gsm), surface morphology of the filaments, may all be varied locally in the two dimensional plane, as desired. In one or more embodiments, the web is designed to mimic the performance of a spider's web.

Figure 9A:
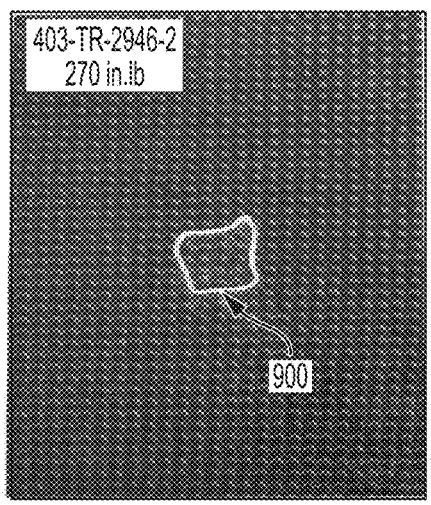
Figure 9B:
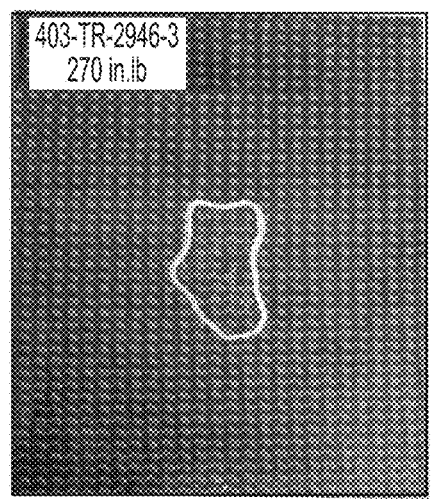
Figure 9C:
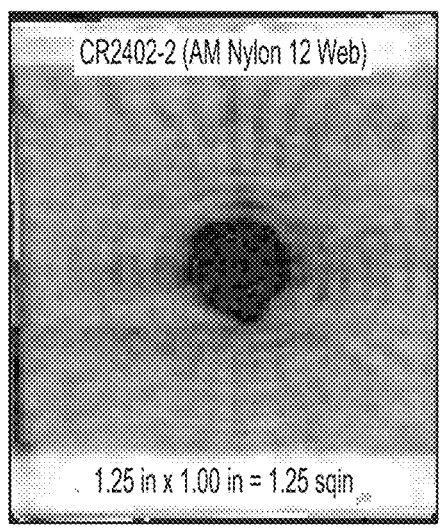
Figure 9D:
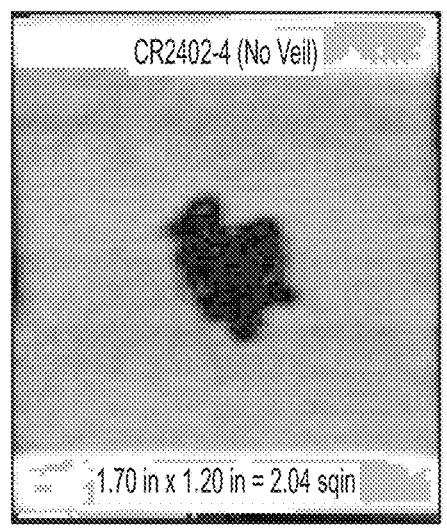
Figure 9E:
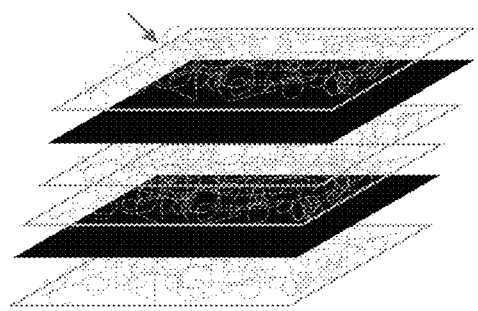

FIGS. 9A-9D illustrate the performance of a toughened composite wherein the veil layer comprises a web architecture as illustrated herein. The data shows >30% reduction in length and area of the impact damage area 900, spherical crack containment, dent depth under a 270-in·lb impact in a range of 0.014 to 0.016-inches, and compression after impact CAI under a 270-in·lb impact of 30 ksi (vs 25 ksi as compared to a control device where the veil layer comprises randomly disposed fibers as illustrated in FIG. 9E).

Figure 10:
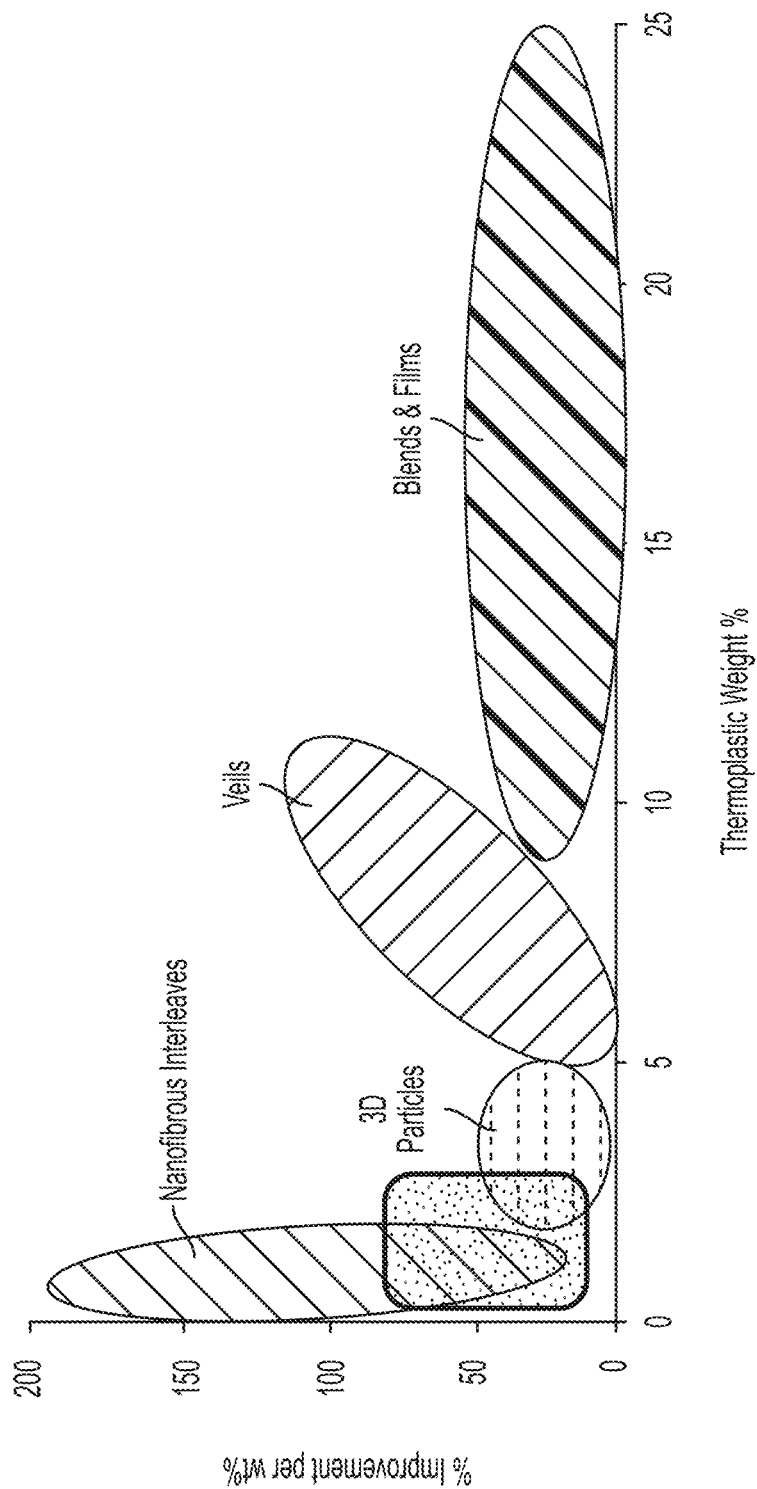
FIG. 10 illustrates target properties achievable using the webbed design described herein.

FIG. 10 shows that the spider based web structure described herein performs at least as well as nanofibrous interleaves.

Applications of the two dimensional fibrous architectures are not limited to veils or a toughening architectures. In other examples, the two dimensional structure is used as an adhesive or mechanical interlocking device. In one example, the adhesive comprises one surface including the two dimensional network of filaments and another surface including hooks, wherein the surfaces are adhered when the hooks hook onto the filaments.

Advantages and Improvements

Conventional FDM creates 3D parts by depositing layers of thermoplastic on top of one-another (layer by layer). However, this process has the following drawbacks as compared to exemplary drop draw extrusion methods described herein:

(1) FDM is slow—because the nozzle is in close proximity to the preceding layer, and the thermoplastic needs time to bond to the preceding layer, the feed rate (rate at which the nozzle translates) is slower than achievable using exemplary DD/E methods.

(2) The diameter of filament that is produced using FDM is larger than achievable using exemplary DD/E methods. Moreover, the DD/E method described herein is capable of producing a larger range of repeatable thermoplastic filament diameters as compared to conventional FDM.

(3) Conventional FDM is performed on flat substrates to avoid collision of the nozzle with the substrate which could occur on curved or non-flat substrates (resulting in failed prints). Illustrative DD/E methods, on the other hand, are capable of depositing on non flat (e.g., curved) substrates because the DD/E process does not deposit material directly on top of a preceding layer; instead, only anchor points are formed on the substrate and there is a large space between the substrate and the nozzle while drawing/extruding the filaments from the nozzle. As a result the nozzle can translate at much higher speeds without the risk of collision with the substrate. The larger space between the nozzle and the substrate also reduces the likelihood of print head collisions between the substrate and the two dimensional printed architecture, improving reliability and success rate of the process.

(4) Large conventional industrial equipment that is run in batches can only create large areas of a single, non varying, architecture. Their major drawback is the inability to vary direction, diameter, form, and physical properties of the architecture on a location by location basis as can be achieved using exemplary DD/E methods described herein.

Processing Environment

Figure 11:
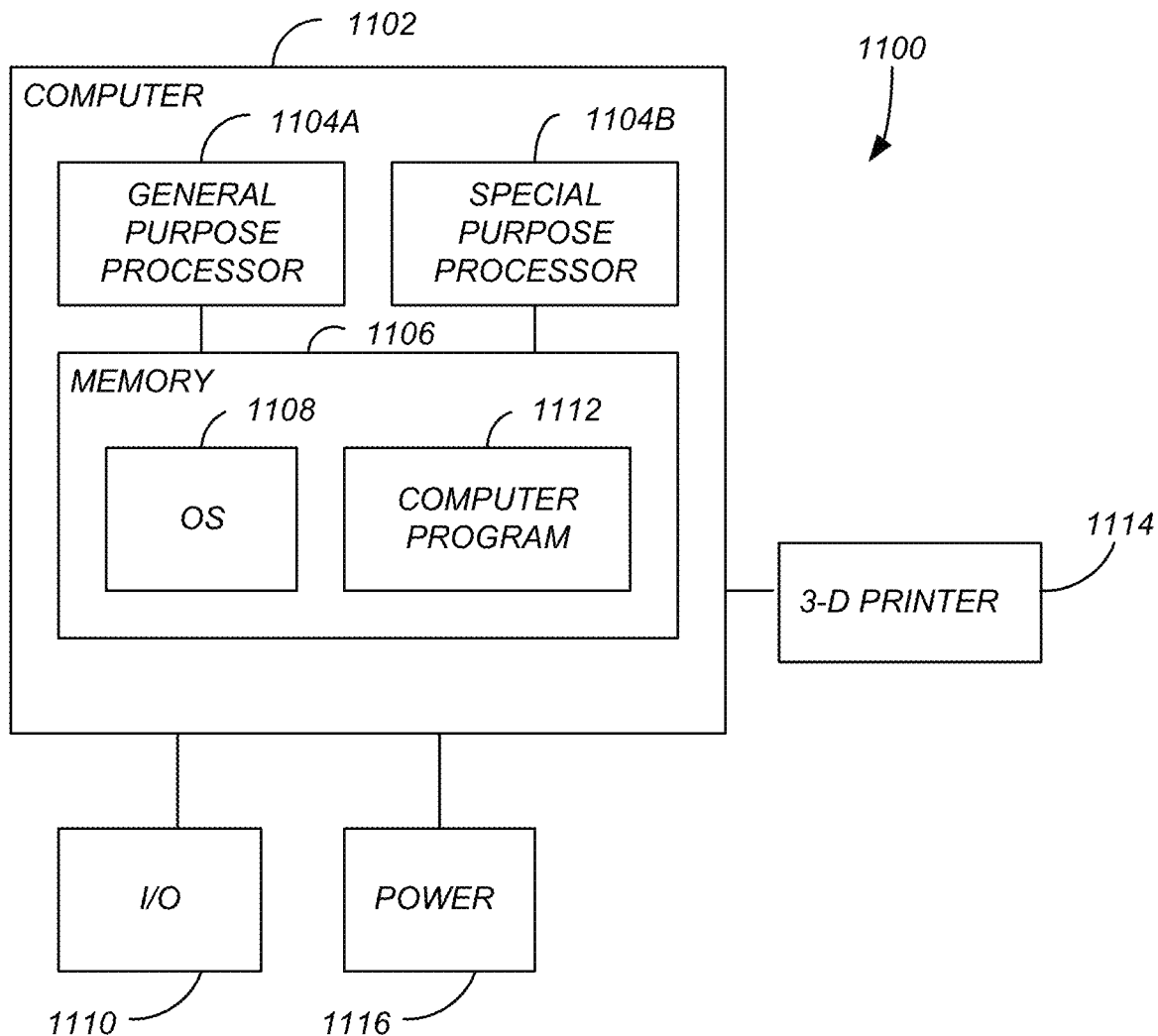
FIG. 11 is an example computer hardware environment for controlling the DD/E machine according to embodiments of the present disclosure.

FIG. 11 illustrates an exemplary system 1100 used to implement processing elements needed to control the AM machine described herein.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1112 are tangibly embodied in the memory 1106, thereby making one or more computer program products or articles of manufacture capable of controlling AM process parameters including, but not limited to, filament feed rate and nozzle temperature, speed, and position, in accordance with the design of the structures being fabricated. As such, the terms "article of manufacture," "program storage device" and "computer program product" as used herein are intended to encompass a computer program accessible from any computer readable device or media. In one or more examples, the computer program is implemented in a numerical control programming language.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A structure, comprising:
   anchors on a substrate, the anchors comprising anchor pairs, each of the anchor pairs comprising a first anchor at a first position on the substrate and a second anchor at a second position on the substrate; and
   a two-dimensional network, comprising interconnected filaments, each of the interconnected filaments comprising a filament, connecting the first anchor to the second anchor, and each of the interconnected filaments consisting essentially of a thermoplastic or a hybrid of a thermoplastic that has been formed from a molten state.

2. The structure of claim 1, wherein the filament is drawn from the first anchor to the second anchor.

3. The structure of claim 1, wherein the filament has a diameter from 30 micrometers to 400 micrometers.

4. A structure, comprising:
   anchors on a substrate, the anchors comprising anchor pairs, each of the anchor pairs comprising a first anchor at a first position on the substrate and a second anchor at a second position on the substrate; and
   a two-dimensional network, comprising interconnected filaments, each of the interconnected filaments comprising a filament, connecting the first anchor to the second anchor, wherein the filament has a diameter, the first anchor has a minimum diameter, and the diameter is from 1.5% to 62% of the minimum diameter.

5. The structure of claim 1, wherein each of the anchors has a minimum diameter from 0.25 millimeters to 2.0 millimeters.

6. The structure of claim 1, wherein at least one of the interconnected filaments or the anchors comprises printable material.

7. The structure of claim 1, wherein at least one of the anchors or the interconnected filaments comprises a thermoplastic or a hybrid of the thermoplastic.

8. The structure of claim 1, wherein at least one of the anchors comprises at least one of polymer, carbon, or metal.

9. The structure of claim 1, wherein the substrate comprises fiber tows.

10. The structure of claim 1, wherein the substrate comprises fiber tows, woven so as to form a mat.

11. The structure of claim 1, wherein the substrate comprises at least one of a unidirectional tape or a braided fabric.

12. The structure of claim 1, wherein the substrate comprises a non-woven fabric.

13. A composite material, comprising:
    a laminate, comprising:
       a first layer, comprising anchors on a substrate, the anchors comprising anchor pairs, each of the anchor pairs comprising a first anchor at a first position on the substrate and a second anchor at a second position on the substrate;
       a second layer; and
       an interlayer between the first layer and the second layer, wherein the interlayer comprises a two-dimensional network, comprising interconnected filaments, each of the interconnected filaments comprising a filament, connecting the first anchor to the second anchor.

14. An adhesive, comprising the structure of claim 1.

15. A mechanical interlocking device comprising the structure of claim 1.

16. A composite material, comprising the structure of claim 1 and further comprising a veil, comprising the two-dimensional network, wherein the veil reinforces the composite material.

17. The structure of claim 1, wherein the two-dimensional network comprises the interconnected filaments disposed in a web.

18. The structure of claim 17, comprising:
    a plurality of nested rings,
    wherein:
       the interconnected filaments comprise first filaments and second filaments,
       each of the first filaments is disposed so as to form one of the nested rings, and
       each of the second filaments is radially disposed so as to connect the nested rings.

19. A method of making a structure, the method comprising steps of:
    printing anchors on a substrate using additive manufacturing, the anchors comprising anchor pairs, each of the anchor pairs comprising a first anchor at a first position on the substrate and a second anchor at a second position on the substrate; and
    for each of the anchor pairs, connecting the first anchor to the second anchor with a filament so as to form a two-dimensional network, comprising interconnected filaments, wherein each of the interconnected filaments consists essentially of a thermoplastic or a hybrid of a thermoplastic and wherein the step of connecting the first anchor to the second anchor comprises drawing the thermoplastic or the hybrid of the thermoplastic from a molten state.

20. The structure of claim 1, wherein the filament has a length from 5 centimeters to 10 meters.

* * * * *